(12) United States Patent
Ozin et al.

(10) Patent No.: US 9,764,959 B2
(45) Date of Patent: Sep. 19, 2017

(54) NANOSTRUCTURED METAL OXIDE COMPOSITIONS FOR APPLIED PHOTOCATALYSIS

(71) Applicants: Geoffrey A. Ozin, Toronto (CA); Thomas Edward Wood, Mississauga (CA); Laura Brennan Hoch, Toronto (CA)

(72) Inventors: Geoffrey A. Ozin, Toronto (CA); Thomas Edward Wood, Mississauga (CA); Laura Brennan Hoch, Toronto (CA)

(73) Assignee: THE GOVERNING COUNCIL OF THE UNIVERSITY OF TORONTO, Toronto, ON (CA)

( * ) Notice: Subject to any disclaimer, the term of this patent is extended or adjusted under 35 U.S.C. 154(b) by 296 days.

(21) Appl. No.: 14/271,985

(22) Filed: May 7, 2014

(65) Prior Publication Data

US 2015/0321174 A1 Nov. 12, 2015

(51) Int. Cl.
*C01B 31/18* (2006.01)
*B01J 23/08* (2006.01)
(Continued)

(52) U.S. Cl.
CPC .............. *C01B 31/18* (2013.01); *B01J 19/127* (2013.01); *B01J 23/08* (2013.01); *B01J 35/002* (2013.01);
(Continued)

(58) Field of Classification Search
CPC .. C01B 31/18; B01J 37/02; B01J 37/08; B01J 35/02; B01J 35/08; B01J 19/127;
(Continued)

(56) References Cited

U.S. PATENT DOCUMENTS 3,835,068 A * 9/1974 West .................... B01J 37/08
502/243
8,519,012 B2 8/2013 O'Connor
(Continued)

FOREIGN PATENT DOCUMENTS

WO 2013/063064 5/2013

OTHER PUBLICATIONS

Gan, Jiayong, et al. "Oxygen vacancies promoting photoelectrochemical performance of In2O3 nanocubes." Scientific reports 3 (2013).*
(Continued)

*Primary Examiner* — Richard M Rump
(74) *Attorney, Agent, or Firm* — Norton Rose Fulbright Cana

(57) ABSTRACT

A nanostructured metal oxide composition comprising hydroxides or oxygen vacancies or both hydroxides and oxygen vacancies on its surface is described. A process for preparing the nanostructured metal oxide composition comprising hydroxides or oxygen vacancies or both hydroxides and oxygen vacancies on its surface, which hydroxides and oxygen vacancies can participate in chemical reactions, which composition is prepared by a method selected from the group of methods comprising: i) controlled thermally induced dehydroxylation of nanostructured metal hydroxide precursors; ii) thermochemical reaction of said nanostructured metal oxide with hydrogen gas; iii) vacuum thermal treatment of said nanostructured metal oxide; and iv) aliovalent doping with a lower oxidation state metal. A photocatalyst comprising a nanostructured metal oxide composition comprising an optimal loading of hydroxides or oxygen vacancies or both hydroxides and oxygen vacancies on its surface, which hydroxides and/or oxygen vacancies can participate in chemical or physical reactions.

30 Claims, 5 Drawing Sheets

(51) Int. Cl.
  B01J 35/08    (2006.01)
  B01J 35/02    (2006.01)
  B01J 37/02    (2006.01)
  B01J 37/08    (2006.01)
  B01J 19/12    (2006.01)
  B01J 37/03    (2006.01)
  B01J 35/00    (2006.01)

(52) U.S. Cl.
  CPC .......... *B01J 35/004* (2013.01); *B01J 35/006* (2013.01); *B01J 35/02* (2013.01); *B01J 35/08* (2013.01); *B01J 37/0221* (2013.01); *B01J 37/031* (2013.01); *B01J 37/08* (2013.01); *B01J 2219/1203* (2013.01); *Y10T 428/2982* (2015.01)

(58) Field of Classification Search
  CPC B01J 37/0221; B01J 23/08; B01J 2219/1203; Y10T 428/2982
  See application file for complete search history.

(56) References Cited

U.S. PATENT DOCUMENTS

| 2003/0207112 | A1* | 11/2003 | Yadav | ...................... | B01J 23/08 428/402 |
| 2013/0058861 | A1* | 3/2013 | Idem | ........................ | B01J 37/08 423/651 |
| 2013/0192976 | A1 | 8/2013 | Sambandan et al. | | |

OTHER PUBLICATIONS

Mazzera, Margherita, et al. "Low-temperature In2O3 nanowire luminescence properties as a function of oxidizing thermal treTatments." Nanotechnology 18.35 (2007): 355707.*

Zhang, X., et al. "The role of oxygen vacancy—Ti3+ states on TiO2 nanotubes' surface in dye-sensitized solar cells" Materials Letters (2013).*

Ye, Jingyun, Changjun Liu, and Qingfeng Ge. "DFT study of CO2 adsorption and hydrogenation on the In2O3 surface." The Journal of Physical Chemistry C 116.14 (2012): 7817-7825.*

Liu, Lianjun, Cunyu Zhao, and Ying Li. "Spontaneous dissociation of CO2 to CO on defective surface of Cu (I)/TiO2—x nanoparticles at room temperature." The Journal of Physical Chemistry C 116.14 (2012): 7904-7912.*

Park, Dong Jin, et al. "Synthesis of Sm-doped TiO2 nanotubes and analysis of their methylene blue-removal properties under dark and UV-irradiated conditions." Research on Chemical Intermediates 39.4 (2013): 1581-1591.*

Wu, Jeffrey CS, and Chao-Wei Huang. "In situ DRIFTS study of photocatalytic CO 2 reduction under UV irradiation." Frontiers of Chemical Engineering in China 4.2 (2010): 120-126.*

Ahmed, Naveed, et al., "Photocatalytic Conversion of Carbon Dioxide into Methanol using Zinc-Copper-M(III) (M=Aluminum, Gallium) Layered Double Hydroxides", Journal of Catalysis, 2011, 279, 123-135.

Bensaid, Samir, et al., "Towards Artificial Leaves for Solar Hydrogen and Fuels from Carbon Dioxide", ChemSusChem, 2012, 5, 500-521.

Bielz, Thomas, et al., "Hydrogen on In2O3: Reducibility, Bonding, Defect Formation, and Reactivity", J. Phys. Chem. C 2010, 114, 9022-9029.

Chen, Xiaobo, et al., "Increasing Solar Absorption for Photocatalysis with Black Hydrogenated Titanium Dioxide Nanocrystals", Science, 2011, 331, 746-750.

Efros, Al. L., et al., "Band-Edge Exciton in Quantum Dots of Semiconductors with a Degenerate Valence Band: Dark and Bright Exciton States", Physical Review B, Condense. Matter, 1996, 54, 4843-4856.

Auroux, Aline, et al., "Microcalorimetric Study of the Acidity and Basicity of Metal Oxide Surfaces", J. Phys. Chem., 1990, 94, 6371-6379.

Habisreutinger, S.N., et al., "Photocatalytic Reduction of CO2 on TiO2 and Other Semiconductors", Angew. Chem. Int. Ed., 2013, 52, 7372-7408.

Aiken III, J.D., et al., "A Review of Modern Transition-Metal Nanoclusters: Their Synthesis, Characterization, and Applications in Catalysis", Journal of Molecular Catalysis A: Chemical, 1999, A 145, 1-44.

Izumi, Yasuo, "Recent Advances in the Photocatalytic Conversion of Carbon Dioxide to Fuels with Water and/or Hydrogen using Solar Energy and Beyond", Coordination Chemistry Reviews, 2013, 257, 171-186.

Li, Kimfung, et al., "A Critical Review of CO2 Photoconversion: Catalysts and Reactors", Catalysis Today, 2014, 224, 3-12.

Linsebigler, Amy L., et al., "Photocatalysis on TiO2 Surfaces: Principles, Mechanisms, and Selected Results", Chem. Review, 1995, 95, 735-758.

Lorenz, Harald, et al., "Novel Methanol Steam Reforming Activity and Selectivity of Pure In2O3", Applied Catalysis A: General, 2008, 347, 34-42.

Maeda, Kazuhiko, et al., "Photocatalytic Water Splitting: Recent Progress and Future Challenges", J. Phys. Chem. Lett., 2010, 1, 2655-2661.

Navalon, Sergio, et al., "Photocatalytic CO2 Reduction using Non-Titanium Metal Oxides and Sulfides", ChemSusChem, 2013, 6, 562-577.

Olah, George A., et al., "Anthropogenic Chemical Carbon Cycle for a Sustainable Future", J. Am. Chem. Soc., 2011, 133, 12881-12898.

Ratnasamy, Chandra, et al., "Water Gas Shift Catalysis", Catalysis Reviews: Science and Engineering, 2009, 51, 325-440.

Sun, Qidi, et al., "In2O3 as a Promising Catalyst for CO2 Utilization: A Case Study with Reverse Water Gas Shift over In2O3", Greenhouse Gas Sci. Technol., 2014, 4, 140-144.

Swihart, Mark T., "Vapor-Phase Synthesis of Nanoparticles", Current Opinion in Colloid and Interface Science, 2003, 8, 127-133.

Walsh, Aron, et al., "Nature of the Band Gap of In2O3 Revealed by First-Principles Calculations and X-Ray Spectroscopy", Physical Review Letters, 2008, 100, 167402-1-167402-4.

Yang, Chieh-Chao, et al., "Artificial Photosynthesis over Crystalline TiO2-Based Catalysts: Fact or Fiction?", J. Am. Chem. Soc., 2010, 132, 8398-8406.

Ye, Jingyun, et al., "Active Oxygen Vacancy Site for Methanol Synthesis from CO2 Hydrogenation on In2O3(110): A DFT Study", ACS Catalysis, 2013, 3, 1296-1306.

Yoshida, Satohiro, et al., "A New Type of Photocatalysis Initiated by Photoexcitation of Adsorbed Carbon Dioxide on ZrO2", Catalysis Surveys from Japan, 2000, 4, 2, 107-114.

Yui, Tatsuto, et al., "Photochemical Reduction of CO2 Using TiO2: Effects of Organic Adsorbates on TiO2 and Deposition of Pd onto TiO2", ACS Appl. Mater. Interfaces, 2011, 3, 2594-2600.

Zhou, Han, et al., "An Insight into Artificial Leaves for Sustainable Energy Inspired by Natural Photosynthesis", ChemCatChem, 2011, 3, 513-528.

* cited by examiner

NANOSTRUCTURED METAL OXIDE COMPOSITIONS FOR APPLIED PHOTOCATALYSIS

FIELD

This description relates to the field of applied photocatalysis, in particular to the production of sustainable energy using carbon dioxide as feedstock for making fuels or other chemical precursors, novel compositions for use as active photocatalysts and methods for preparing them.

BACKGROUND

Currently there is growing interest in investigating nanostructured semiconductors that function as $CO_2$ reduction photocatalysts that utilize sunlight for generating fuels in an artificial photosynthetic device (e.g. Bensaid et al. ChemSusChem 2012, 5, pp 500-521 and Izumi Coord. Chem. Rev. 2013, 257, pp 171-186). Conversion of $CO_2$ derived from fossil fuel-based energy and manufacturing waste streams into valuable products, such as carbon monoxide, methane, or methanol, would represent a huge economic and environmental benefit, simultaneously addressing issues of energy security and climate change. While artificial photosynthesis can exist in multiple configurations, gas phase photocatalysis has recently been identified in Olah et al. J. Am. Chem. Soc. 2011, 133, pp 12881-128980 as a scalable and economically feasible option for large-scale $CO_2$ reduction. Artificial photosynthetic devices have been documented (Paul O'Connor U.S. Pat. No. 8,519,012 and Mengyan Shen, Cong Wang, Yeshaya Koblick, WO2013063064), however, each device is unique and functions under specific operating conditions. It is still unknown which materials compositions and properties are ideal to facilitate gas phase photocatalytic conversion of carbon dioxide.

A semiconductor photocatalyst is a type of catalyst that absorbs light in a manner which changes the surface chemistry of the semiconductor thereby providing a means to drive chemical reactions. Semiconductor photocatalysts are heterogeneous catalysts, which mean the reactant components exist in a different phase (liquid or gas) than the catalyst (solid). A functional photocatalyst must absorb light, preferably in the ultraviolet and visible spectral regions for solar powered applications. When a semiconductor photocatalyst absorbs light with energy greater than the electronic band gap of the semiconductor, excited electrons are promoted to the conduction band while the number of electron holes in the valence band is increased above equilibrium concentrations. These energetic charge carriers (photogenerated electron and electron hole (e/h) pairs in excess of equilibrium concentrations) can facilitate surface chemical reactions of interest. The photoexcited electron should have an electrochemical potential energy that is more negative than the reduction potential required to reduce carbon dioxide or a surface species originating from carbon dioxide. These e/h pairs must have a long enough lifetime to be able to diffuse to the surface of the semiconductor, with minimal recombination, in order to transfer or accept electrons from adsorbed molecules. Additionally, this material should have a favorable surface that preferentially absorbs reactants and desorbs products and must be stable under relevant reaction conditions.

Metal oxide semiconductors are a class of materials which satisfy the above conditions. These materials can be made of earth abundant elements and fabricated at industrial scales using existing technology. Notably, the physical dimensions of metal oxides can be easily controlled from the macroscale to the nanoscale, affecting material properties such as the electronic band gap, charge-transport, and surface area. Because of these properties, metal oxide nanomaterials have been used as photocatalysts; the most often reported and studied is titania, $TiO_2$. Titania-based photocatalysts have been documented (Ekambaram Sambandan, Rajesh Mukherjee, Takuya Fukumura U.S.20130192976). Metal oxide semiconductors have been reported to use sunlight to decompose organic compounds and dyes in both the gas and aqueous phase (Linsebigler, et al. Chem. Rev. 1995, 735-758). They also have been used successfully in photoelectrochemical cells for water splitting. There is growing interest in designing a semiconductor photocatalyst that is capable of $CO_2$ photoreduction (Navalón, Set al. ChemSusChem 2013, 6, 562-577), but much of the field is misguided since most studies do not perform isotope tracing experiments, for example using $^{13}CO_2$, to verify the origin of the observed carbon-containing products (Yang, C.-C et al. J. Am. Chem. Soc. 2010, 132, 8398-8406). Because of ubiquitous carbon contamination from carbon-containing precursors, solvents and ligand additives used to control the nanostructure morphology, the validity of many of these results has been called into question. More recently a few studies have used isotope tracing experiments to validate their claims, most notably Yoshida et al. $^{13}CO_2$ to validate the efficacy of their $ZrO_2$ catalyst, activated with deep UV light, for CO production (Yoshida et al. Catalysis Surveys from Japan, 2000 4, 2,pp 107-114). Despite the growing interest and investment in the field, there are few examples of successful efficient gas-phase photocatalysts, particularly those active in the visible region of the solar spectrum, suggesting new approaches to materials discovery are necessary. One such approach that has been employed successfully is the intentional creation of oxygen deficient metal oxides via hydrogen treatment, which can generate active catalytic sites and mid-gap defect stares, enhancing both the visible absorption and photocatalytic activity of the material. The most notable example of this is black titiania, $TiO_{2-x}H_x$, which exhibits a substantial increase in absorption (83% of the solar spectrum) and activity for hydrogen generation (Chen, et al. Science 2011, 331, pp 746-750) clearly demonstrating the effectiveness of oxygen vacancies in enhancing photocatalytic activity. Another approach to increasing the photocatalytic activity of metal oxide nanomaterials is by improving the $CO_2$ capture capacity of the nanoparticle surface. Several groups have demonstrated the efficacy of surface hydroxides at enhancing the affinity of $CO_2$ for photocatalytic surface, with demonstrated enhancement of photocatalytic activity (Ahmed, et al. J. Catal. 2011, 279, pp 123-135).

SUMMARY

Described herein is a nanostructured metal oxide prepared in a manner which allows its surface to contain hydroxide groups and/or oxygen vacancies that demonstrates gas phase carbon dioxide adsorption and photo-reduction under visible and ultraviolet light irradiation. A distinctive feature of the nanostructured metal oxide is that it provides a chemically active surface that can capture carbon dioxide and transfer charges generated by the absorption of light to adsorbed species.

By combining oxygen vacancies, efficient $CO_2$ capture, and strong UV and visible light absorption, photocatalysts with significant activity towards $CO_2$ reduction can be created.

This disclosure relates to the design and fabrication of a photocatalyst capable of activating carbon dioxide through the photoreduction of carbon dioxide, or related adsorbed surface species (e.g. bicarbonate, carbonate, carboxyl, formate hydride, methyl, ethyl, formyl, methoxide, ethoxide), that is composed of a nanoparticle metal oxide, with oxygen vacancies and/or a hydroxylated surface and the production of said photocatalyst through, for example thermal dehydroxylation of a nanoparticle precursor, which results in production of the oxygen vacancies and hydroxylated surface.

The photocatalyst is useful for reactions which require activation of carbon dioxide, such as methanol photosynthesis ($CO_2+2H_2O \rightarrow CH_3OH+3/2O_2$), methane photosynthesis ($CO_2+2H_2O \rightarrow CH_4+2O_2$), methanol synthesis ($CO_2+3H_2 \rightarrow CH_3OH+H_2O$), the Sabatier reaction ($CO_2+4H_2 \rightarrow CH_4+2H_2O$), higher hydrocarbon synthesis ($nCO_2+(3n+1)H_2 \rightarrow C_nH_{2n+2}+2_nH_2O$) or reverse water gas shift ($CO_2+H_2 \rightarrow CO+H_2O$), where $CO_2$ absorbs to the photocatalyst surface, enhanced by the surface populated with oxygen vacancies and hydroxyl groups, and is activated (reduced) by a photoelectron produced by exposure to visible and UV light irradiation. The reaction process does not necessarily require the direct transfer of charge to carbon dioxide, but can occur through intermediate species on the surface formed by interaction of carbon dioxide with the surface and/or other reactant gases. This photocatalyst can also be applied to alternative processes conceivable to those skilled in the art, including varying the reaction temperatures, reaction pressures, and reactant gases.

One fabrication process involves the synthesis of a hydroxide containing precursor at the nanoscale, which is subsequently heat treated for a set time at a set temperature to dehydroxylate the precursor to produce nanoparticles of a specified diameter, which maintains populations of hydroxides and oxygen vacancies on the surface of the nanoparticle from the synthesis. This photocatalyst can be composed of any suitable metal oxide, which has the properties described above. This metal oxide may be altered via substitutions of the metal cation and/or oxygen anion, or combined with additional metal and/or metal oxide co-catalysts. An example of a composition is $In_2O_3$, which can be paired with additional metal or metal oxide catalysts, and/or be doped via cation and/or anion substitution.

More particularly, there is provided a nanostructured metal oxide composition comprising hydroxides or oxygen vacancies or both hydroxides and oxygen vacancies on its surface. The nanostructured metal oxide composition may have an average particle size of from about 1000 nm to about 1 nm. The metal may be selected from the group of metals consisting of a main group, a transition group and a rare earth group metal. The nanostructured metal oxide composition may adsorb carbon dioxide physically or chemically or both physically and chemically. The nanostructured metal oxide composition in one form has an electronic configuration that provides long-lived photo-generated electron and hole-pairs, increasing the opportunity for charge transfer between the composition and adsorbed surface species.

In some forms the nanostructured metal oxide comprises a nanoparticle film or nanoparticles dispersed onto a support material. The particle film may be formed using a method selected from the group consisting of sputtering, spin-coating, dip-coating, drop-casting, spray-coating, pulsed laser deposition and electro-spinning.

The nanostructured metal oxide composition may have a shape selected from the group consisting of solid spheres, cylinders, disks, platelets, hollow spheres and tubes. In some forms the crystal structure of the metal oxide contains bixbyite $M_2O_3$ lattice type as the oxygen vacancies. The metal oxide may be a semiconductor having an electronic band-gap between 1 eV and 4.0 eV and a forbidden electronic band-gap. The metal oxide may be photoactive towards the reduction of $CO_2$ in the gas phase or the liquid phase.

In another aspect of this disclosure there is provided a process for preparing a nanostructured metal oxide composition comprising hydroxides or oxygen vacancies or both hydroxides and oxygen vacancies on its surface, which hydroxides and oxygen vacancies can participate in chemical reactions, which composition is prepared by a method selected from the group of methods comprising: i) controlled thermally induced dehydroxylation of nanostructured metal hydroxide precursors; ii) thermochemical reaction of said nanostructured metal oxide with hydrogen gas; iii) vacuum thermal treatment of said nanostructured metal oxide; and iv) aliovalent doping with a lower oxidation state metal.

The nanostructured metal oxide composition finds utility as a photocatalyst which comprises an optimal loading of hydroxides or oxygen vacancies or both hydroxides and oxygen vacancies on its surface, which hydroxides and/or oxygen vacancies can participate in chemical reactions or physical reactions or both.

The photocatalyst may be used in the photocatalytic reduction of carbon dioxide under visible or ultra violet light irradiation or both, either directly or via a surface intermediate species, to produce a fuel, wherein the fuel is selected from the group of fuels consisting of carbon monoxide, methane, methanol, or other hydrocarbons or to produce a feedstock.

The photocatalyst may comprise further co-catalysts, dopants and promoters, which are selected to enhance the overall conversion rate; to change product selectivity, to allow alternative reactions to proceed or to increase the range of the operating conditions.

The photocatalyst may be used in processes employing reactions which require activation of carbon dioxide in the presence of $H_2O$ or $H_2$ and are selected from methanol synthesis ($CO_2+2H_2O \rightarrow CH_3OH+3/2O_2$), methane synthesis ($CO_2+2H_2O \rightarrow CH_4+2O_2$), methanol synthesis ($CO_2+3H_2 \rightarrow CH_3OH+H_2O$), the Sabatier reaction ($CO_2+4H_2 \rightarrow CH_4+2H_2O$), reverse water gas shift reaction ($CO_2+H_2 \rightarrow CO+H_2O$), higher hydrocarbon synthesis ($nCO_2+(3n+1)H_2 \rightarrow C_nH_{2n+2}+2_nH_2O$), where $CO_2$ absorbs to the photocatalyst surface, enhanced by the optimised oxygen vacancy and hydroxyl surface, and is reduced by a photoelectron produced by exposure to visible and UV light irradiation.

In its most specific form, the nanostructured metal oxide composition comprises hydroxylated indium oxide nanoparticles ($In_2O_{3-x}(OH)_y$), where x and y are integer or non-integer values and x ranges from 0 to 3 and y ranges from 0 to 3, populated with surface hydroxides and oxygen vacancies.

The process for producing hydroxylated indium oxide nanoparticles ($In_2O_{3-x}(OH)_y$), where x and y are integer or non-integer values and where x ranges from 0 to 3 and y ranges from 0 to 3, populated with surface hydroxides and oxygen vacancies by a controlled thermal dehydration of $In(OH)_3$, and calcining the composition thereafter to improve its crystallinity for the purpose of increasing the mobility of photogenerated electronic charge carriers. A specific process for photocatalytically reducing $CO_2$ to produce CO uses a photocatalyst comprising the hydroxylated indium oxide nanoparticles indium oxide nanoparticles ($In_2O_{3-x}(OH)_y$), where x and y are integer or non-integer values and where x ranges from 0 to 3 and y ranges from 0 to 3, populated with surface hydroxides and oxygen vacancies in the presence of solar radiation and $H_2$ atmosphere.

BRIEF DESCRIPTION OF THE DRAWINGS

The accompanying drawings serve to illustrate the invention. In the drawings:

FIG. 2a shows a TEM micrograph of $In(OH)_3$ treated at 185° C. FIG. 2b shows a TEM micrograph of $In_2O_3$ treated at 250° C. FIG. 2c shows a TEM micrograph of the $In_2O_3$ sample treated at 350° C. FIG. 2d shows a TEM micrograph of the $In_{23}$ sample treated at 450° C.

FIG. 3a corresponds to an $In_2O_3$ sample that was calcined at 250° C. FIG. 3b corresponds to an $In_2O_3$ sample that was calcined at 350° C. FIG. 3c corresponds to an $In_2O_3$ sample that was calcined at 450° C.

FIG. 4a demonstrates that $In_2O_3$, under simulated solar light, drives the reduction of $CO_2$ to CO, which is confirmed by comparing the signal intensity of mass fragments coming from a reaction chamber exposed only to $^{13}CO_2$. Mass fragment 28 AMU corresponds to $^{12}CO$, indicating that its source does not form $CO_2$, and mass fragment 29 AMU corresponds to $^{13}CO_3$ indicating that this signal is derived from $^{13}CO_2$ reduction alone. FIG. 4b illustrates that light has a significant effect at all reaction temperatures, confirming that this is a light-driven reaction. FIG. 4c illustrates that the $CO_2$ reduction rate can be maximized by controlling both the reaction temperature and the sample calcination temperature, with maximum rates achieved for the sample calcined at 250° C. and reacted at 150° C.

FIG. 5a shows the CO production rates of the sample under different light conditions. FIG. 5b shows the overlap of the optical absorption of the $In_2O_3$ nanostructure material with the emission spectra of the light source equipped with different filters.

DETAILED DESCRIPTION

Figure 1:
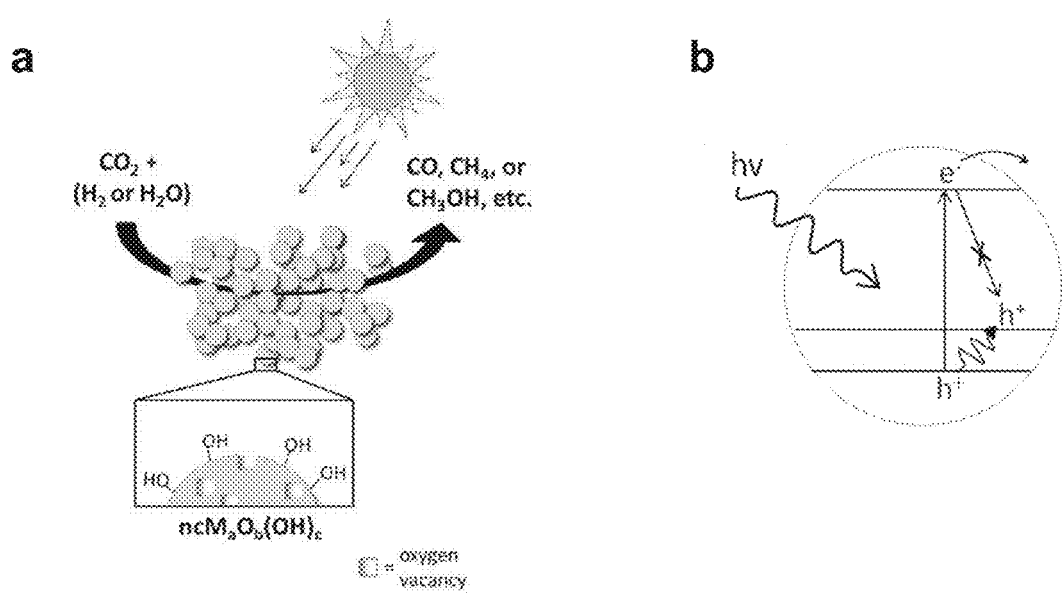
FIG. 1a shows a schematic diagram of an embodiment of the overall carbon dioxide photocatalytic process on nanostructured metal oxide particles. The nanoparticles depicted in this embodiment have a surface containing hydroxides and oxygen vacancies which facilitate the reaction under solar or simulated solar irradiation, The products are exemplified by carbon monoxide, methane, or methanol, among many other possible reaction products.
FIG. 1b illustrates a schematic diagram of how a direct forbidden band gap can lead to longer excited state lifetimes. When a photon (hv) is absorbed, an electron (e−) gets promoted directly to the conduction band, a process represented by the upwards arrow. The remaining hole (h+) will thermalize to the lowest energy state at the top of the valence band, represented by the small waved arrow. Due to symmetry restrictions the excited electron and hole cannot recombine directly, resulting in longer excited state lifetimes.
Figure 2:
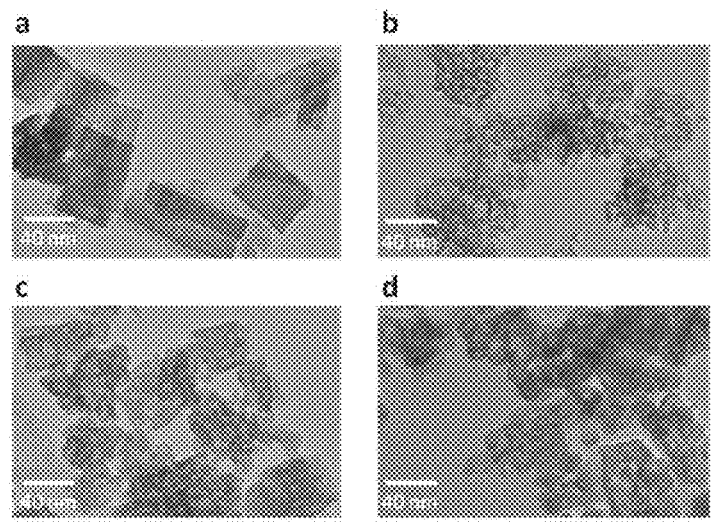
FIG. 2 shows a series of nanostructured $In(OH)_3$ and $In_2O_3$ particles produced under difference calcination temperatures.

The nanostructured hydroxylated metal oxide photocatalyst, described herein, is exemplified by indium oxide nanoparticles ($In_2O_{3-x}(OH)_y$) with surfaces populated by hydroxyl groups and oxygen vacancies, where x and y are integer or non-integer values and where x ranges from 0 to 3 and y ranges from 0 to 3, which are capable of carrying out the photocatalytic reduction of $CO_2$. FIG. 1 shows a schematic diagram of the nanostructured hydroxylated metal oxide photocatalyst ($ncM_aO_b(OH)_c$), where a, b and c are integer and non-integer values with a ranging from 1 to 3, b from 1 to 6 and c from 1 to 6, converting $CO_2$ into fuels or chemical feedstocks. This photocatalyst embodies properties which are applicable to the material selection and design of photocatalysts that can facilitate photoreduction of $CO_2$ in the gas phase. Indium oxide, both doped and undoped, has unique electronic and optical properties which make it a suitable candidate for gas phase photocatalysis. Its conduction band (CB) and valence band (VB) positions on an energy band diagram straddle the $H_2O$ oxidation and $CO_2$ reduction half reaction energies required to drive photosynthetic production of hydrocarbons and carbon monoxide (Habisreutinger, S. N. et al. Angew. Chem. Int. Ed. Engl. 2013, 52, 7372-7408). Additionally, the direct "forbidden" band gap of $In_2O_3$ means that the lowest energy optical transition from the top of the VB to the bottom of the CB is symmetry forbidden (Walsh, Aet al. R. Phys. Rev. Lett. 2008, 100, 167402). This can result in long-lived e-h pair separation—a built in mechanism for keeping the photogenerated electrons and holes apart long enough to do meaningful surface chemistry (Efros, A.; et. al. Phys. Rev. B. Condens. Matter 1996, 54, 4843-4856). In addition to the optical and electronic properties, the surface properties of $In_2O_3$ have garnered interest in the field of thermal heterogeneous catalysis. Sun et al. have demonstrated the high activity of $In_2O_3$ as a thermal catalyst for the reverse water gas shift (RWGS) reaction, specifically citing $CO_2$ capture as a key factor in enhancing the activity (Sun, Q et al. Greenhouse Gases: Sci. and Tech. 2014, 144, 140-144). Ye et al. have suggested in theoretical calculations that surface oxygen vacancies could act as active sites to promote methanol synthesis (Ye, J. et al. ACS Catal. 2013, 3, 1296-1306). Additionally, $In_2O_3$ has been shown to exhibit high $CO_2$ selectivity for methanol steam reforming (Lorenz, et al. Appl. Catal. A Gen. 2008, 347, 34-42). The combination of favourable optical and electronic properties with a selective, carefully designed surface makes $In_2O_{3-x}(OH)_y$ a promising material for gas phase photocatalysis Particle Size These hydroxylated indium oxide nanoparticles $In_2O_{3-x}(OH)_y$ can be produced using controlled thermal dehydroxylation of a metal hydroxide precursor. The hydroxide precursor is heat treated to a temperature slightly above the hydroxide to oxide transition point. Control over the size of the nanoparticle depends on the precursor particles size, morphology, and crystal structure, as well as, the heating rate and the gas atmosphere of the heating environment. An example of $In_2O_{3-x}(OH)_y$ produced using this method are illustrated in FIG. 2. For any material derivative of the preferred embodiment, an optimized particle size and nanostructure surface can be determined by varying the properties of the precursor and the parameters of further processing. A particle size capable of the photocatalytic reduction ranges from about 1000 nm to below about 1 nm, which is the transition from a crystal structure to a molecular cluster. The particle size of the $In_2O_{3-x}(OH)_y$ ranges from about 1000 nm to about1 nm, however, decreasing the particle size increases the surface area, the surface to volume ratio and minimizes the distances for electrons to diffuse to the surface under irradiation relative to the bulk material.

Fabrication methods for nanoparticle synthesis

The hydroxylated nanostructued metal oxide nanoparticles can be prepared via a variety of material fabrication processes. These fabrication processes require chemical precursors, which can take various forms, such as metal salts and pure metals, which are treated using chemical processes. These processes which are familiar to those of skill in the art of nanoparticle synthesis include sputtering, spin-coating, dip-coating, spray-coating, pulsed laser deposition and electro spinning (Iii, J. D. A. & Finke, R. G. J. Mater. Chem. 1999, A 145, 1-44 and Swihart, M. T. Curr. Opin. Colloid interface Sci. 2003, 8, 127-133).

Shapes Of The Nanoparticles

The fabrication process can influence the final shape of the hydroxylated nanostructured metal oxides. While the material composition stays the same, the shape of the nanoparticles can consist of solid spheres, cylinders, disks, platelets, hollow spheres and tubes. The shape of the nanoparticle can alter the ratio and type of surface sites available for reaction, which improves reaction rates, operating conditions and reaction selectivities.

Metal Oxides On Dispersed Support Materials

The demonstrated nanostructured $In_2O_{3-x}(OH)_y$ materials were supported nanoparticle films of agglomerated nanoparticles. These nanoparticles were prepared for catalytic testing by drop casting an aqueous dispersion of each sample onto 1×1" binder free borosilicate glass microfiber filters (Whatman, GF/F, 0.7 pm). The support material provides mechanical strength to the nanoparticle films. Alternative supports may be used. A photocatalyst support should be capable of high and uniform dispersion of the nanoparticles, allowing for high surface area as well as allowing light to irradiate the photocatalyts. Additionally, the support should allow gas or liquid phase reactant transport to the surface of the photocatalyst.

The Metal In Metal Oxide

The success of nanostructured $In_2O_{3-x}(OH)_y$ materials, both modified and unmodified, can be extended to other nanostructured metal oxides that have similar properties. For example other nanostructured metal oxides with a bixbyite $M_2O_3$ structure, where M is either a main group or transition group or rare earth group metal, or is composed of mixtures of multiple types of main group or transition group or rare earth group metal atoms.

One of the defining characteristics of $In_2O_3$ is its unique crystal structure, bixbyite, which can be understood as the $CaF_2$-type lattice with 25% of the tetrahedral anion sites sitting vacant. This additional space in the structure can result in more flexibility, allowing the atoms to be more mobile in the lattice. Additionally, these intrinsic vacancies may increase the stability of vacant surface sites, allowing the material to be stable under reaction conditions. Because the crystal structure of a material is very closely tied to its physical properties, it is likely that other nanostructured metal oxides with the bixbyite $M_2O_3$ structure, where M is either a main group or transition group or rare earth group metal, may also demonstrate success as photocatalysts. Some of the metal oxides that have been demonstrated to have the bixbyite crystal structure include but are not limited to $Y_2O_3$, $V_2O_3$, $Tl_2O_3$, $Ce_2O_3$, $\beta$-$Fe_2O_3$, $\eta$-$Bi_2O_3$, $Gd_2O_3$, and $(Mn.Fe)_2O_3$ (with Mn/Fe ratio greater than or equal to 1). By varying the composition of metals using the same synthesis described herein, the nanostructured metal oxide may be fine-tuned and optimized to produce more active catalysts.

Optimal Oxygen Vacancies And OH Groups

Figure 6:
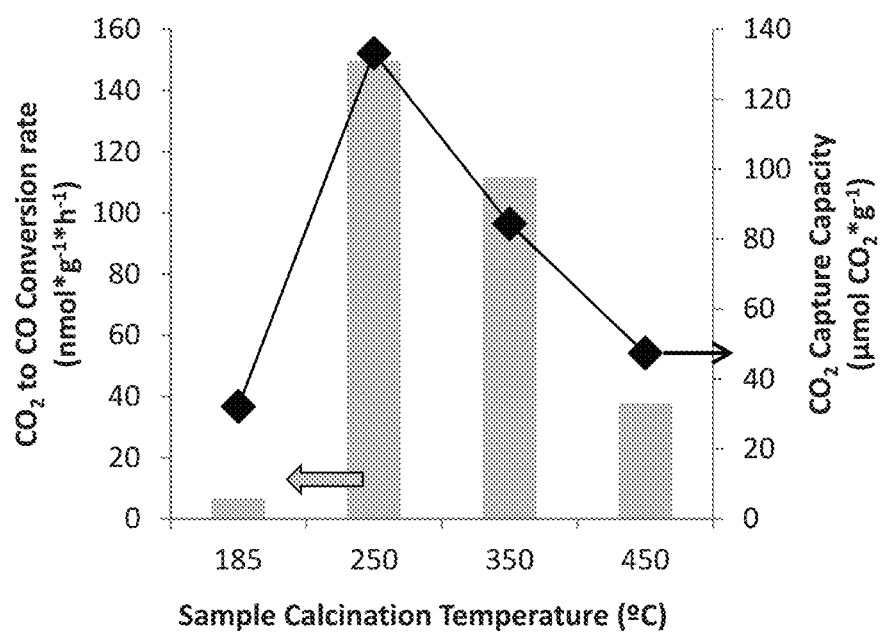
FIG. 6 shows a comparison of $CO_2$ to CO conversion rate vs. the $CO_2$ capture capacity of several different samples prepared at different calcination temperatures. This demonstrates that the nanostructured particle photoactivity is strongly related to the $CO_2$ capture capacity, which is controlled by the surface hydroxides and/or oxygen vacancies.

The affinity of a photocatalyst surface for $CO_2$ has been identified herein, as well as by others (Ahmed, N. et al. Catal, 2011, 279, 123-135), as a critical factor that influences photocatalytic performance. The data, presented in FIG. 6, demonstrates that the $CO_2$ capture capacity of the $In_2O_3$ nanoparticles corresponds very well with $CO_2$ to CO conversion rare, indicating that $CO_2$ adsorption plays an important role in the reaction, Intuitively, $CO_2$ molecules must be able to approach and interact with the surface long enough for electron transfer to occur. Surface hydroxides have a known affinity for the acidic $CO_2$ (Gervasini, A. J. Phys. Chem. 1990, 94, 6371-6379), and as shown, higher hydroxide content corresponds to higher $CO_2$ capture capacities, as well as higher reactivity. However, as illustrated, the $In(OH)_3$ control sample, which has a similar surface area to the nanostructured $In_2O_{3-x}(OH)$ had significantly lower $CO_2$ capture capacity and $CO_2$ activity despite having the greatest hydroxide content. This indicates that a combination of bulk material and surface properties are necessary for both $CO_2$ capture capacity and photocatalytic activity.

Figure 3:
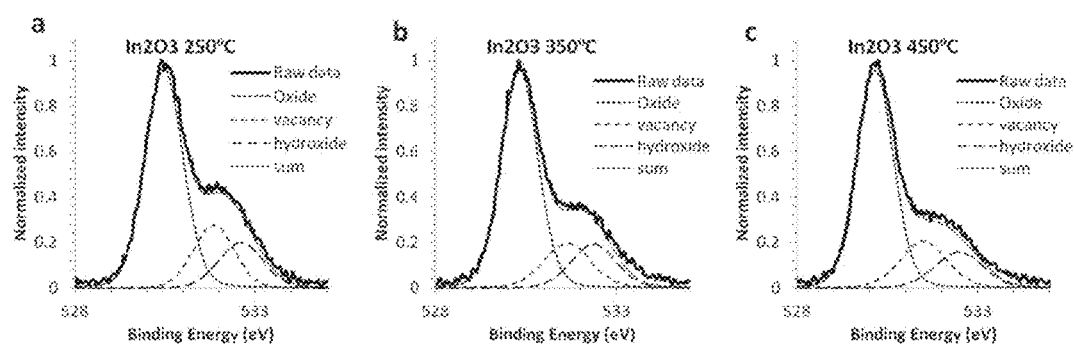
FIG. 3 shows the de-convulsion of XPS O1s emission spectra, demonstrating the presence of 3 different types of oxygen environments: oxide (dotted line), oxygen vacancy (short dashed line), and hydroxides (long dashed line).

In addition to hydroxides, the surface of the $In_2O_3$ nanoparticles is populated with oxygen vacancies. The presence of these oxygen vacancies in the $In_2O_{3-x}(OH)_y$ samples is indicated in FIG. 3. by both the deconvolution of the XPS O 1s peaks (FIGS. 3a, 3b, and 3c) as well as the n-type position of the Fermi-levels relative to the conduction bands (FIG. 3d) which is typically a result of non-stoichiometry. From these figures it is apparent that temperature treatment effects the oxygen vacancies as well as the highest Fermi energy, implying that it likely had more vacancies than the other $In_2O_{3-x}(OH)_y$ samples, These oxygen vacancies may result from the bixbyite crystal structure, described earlier, the natural increase in surface defect sites as the particle size decreases, and/or the interactions between lattice oxygen with the $H_2$ or CO under reaction conditions.

Figure 4:
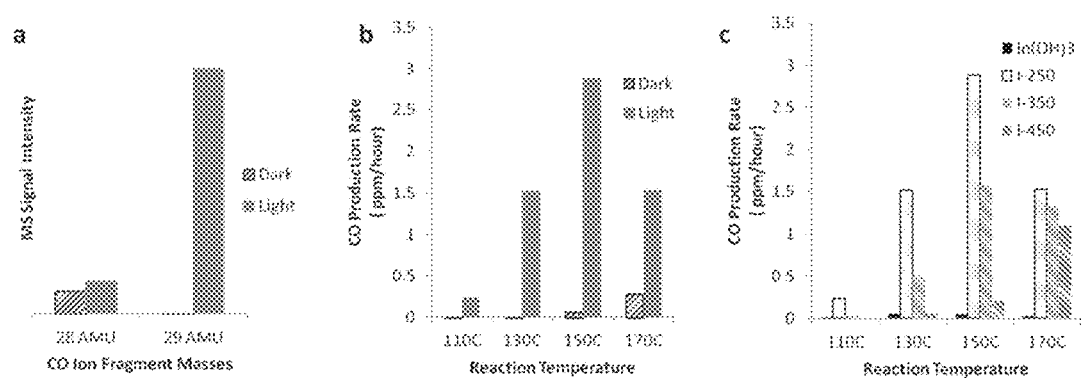
FIG. 4 shows the photocatalytic rate measurements of a series of $In(OH)_3$ and $In_2O_3$ nanostructured materials.

An optimal loading of hydroxides or oxygen vacancies or both hydroxides and oxygen vacancies can be defined as the concentration of either or both species at the surface of a nanostructured metal oxide that results in the highest reactivity. This is demonstrated for the case of $In_2O_3$ by the XPS data in FIG. 3 and the $CO_2$ reduction data shown in FIG. 6, As described above, by controlling the reaction temperature the population of both species may be varied and the greatest reactivity is achieved for the sample calcined at 250° C. which exhibits the highest concentrations of oxygen vacancies and the second highest concentration of hydroxides. It follows that for other nanostructured metal oxides with similar properties to $In_2O_3$, an optimal loading of hydroxides or oxygen vacancies or both hydroxides and oxygen vacancies can be found that maximizes the materials reactivity towards $CO_2$ reduction. The optimal loading is also demonstrated to persist at different reaction temperatures. A series of $In_2O_{3-x}(OH)_y$ samples was prepared by thermal treatment at 250° C., 350° C. and 450° C. FIG. 4b shows the rate of CO production under simulated solar light irradiation at temperatures ranging from 110° C. to 170° C. In general, as the reaction temperature increased the CO production rates increased, reaching a maximum at 150° C., after which the rates began to decrease. A trend was also observed between samples: a lower calcination temperature corresponded to a higher CO production rate. The optimal loading of hydroxides and oxygen vacancies is optimal under different reaction temperatures.

Reaction Environments

The exemplified embodiment benefits from surface oxygen vacancies, however, these vacancies need not be formed via material synthesis exclusively. For this photocatalyst and derivatives the surface oxygen vacancies may form in-situ under reaction conditions or ex-situ via chemical pre-treatments. Surface oxygen vacancies may form due to the result of interactions between lattice oxygen with the $H_2$ or CO under reaction conditions. Surface oxygen vacancies can be generated on $In_2O_3$ in the presence of $H_2$ at temperatures greater than 125° C. (Bielz, T. et al. Phys. Chem. C 2010, 114, 9022-9029). FIG. 4c shows the temperature dependence of $CO_2$ reduction. Very little CO is observed at 110° C., while at 130° C. and above CO production under light irradiation is significant. This indicates that the surface vacancies may be necessary for the reaction to occur photocatalytically. As the reaction temperature is further increased to 150° C., the reactivity improves. However, at 170° C. the reaction rates decrease, which may be due to oxidation of CO by lattice oxygen on the $In_2O_{3-x}(OH)_y$ surface.

Additional factors which influence the reaction rate, product selectivity and conversion are reaction temperatures, pressures and composition. It is well known to those in the art that temperature, pressure and composition impact the effectiveness of a catalyst based on the material properties of the catalyst and thermodynamics of the reaction. Temperature effects the adsorption and desorption of molecules with the surface. At higher temperatures, molecules such as $H_2O$, which can block active sites, may desorb enabling more turnovers at these active sites. Since it is observed that $In_2O_{3-x}(OH)_y$ samples achieve a maximum efficiency at 150° C., this may indicate that 150° C. is a "sweet spot," combining efficient $CO_2$ adsorption and efficient CO and $H_2O$ desorption for the preferred embodiment. However, it is not difficult to imagine that derivatives of the disclosed embodiment require slightly different reaction conditions.

Reaction Intermediates

A hydroxylated nanostructured metal oxide with these defining features is capable of the photocatalytic reduction of $CO_2$, which may occur either directly or via a surface intermediate species, to produce fuels (such as methane, methanol, or longer chain hydrocarbons) and chemical precursors (such as carbon monoxide, formaldehyde, methyl formate or longer chain oxygenated hydrocarbons) under visible and/or ultraviolet light irradiation. The photocatalytic reduction of $CO_2$ is generally thought to proceed through a series of paired reduction and oxidation reactions where $CO_2$ is reduced. The reduction of $CO_2$ may also proceed indirectly by reducing a surface species formed when $CO_2$ adsorbs on the surface as a formate, carbonate, carboxyl, bicarbonate, or similar surface species (Li, K et al. J. Catal. Today 2014, 224, 3-12).

Co-catalysts, Dopants And Promoters

The integration of co-catalysts, dopants and promoters can allow enhancement of the overall conversion rate, change product selectivity, allow alternative reactions to proceed, and/or increases the range of operating conditions (Maeda, K.; Domen, K. J. Phys. Chem. Lett. 2010, 1, 2655-2661). Examples of these co-catalysts, dopants and promoters include, but are not limited to, metals(such as Au, Cu, Ag), metal oxides($TiO_2$, $WO_3$), and metal chalcogenide nanostructures deposited on the surface of the aforementioned $M_2O_3$ class of nanostructures, any dopant atoms incorporated directly into the $M_2O_3$ structure, or any dopant atoms incorporated on the surface of the $M_2O_3$ structure. Addition of a co-catalyst can affect the operating conditions of a reaction by changing the affinity of the reactants and products for the surface of the photocatalyst, assist in the generation of surface oxygen species, generate and diffuse reactive surface species to the reactive site via spillover mechanisms or effect the activation energy for the transition state of the mechanism (Ratnasamy, C.; Wagner, J. P. Catal. Rev. 2009, 51, 325-440).

The artificial leaf (also referred to as artificial photosynthesis or solar fuels systems) is a device that would benefit from a photocatalyst capable of reducing carbon dioxide (Zhou, H. et al.Chem Cat Chem 2011, 3, 513-528). A material capable of photocatalytic reduction would be suitable for this application and easily combined with any of these systems.

Photocatalytic Reaction Of $CO_2$

Figure 5:
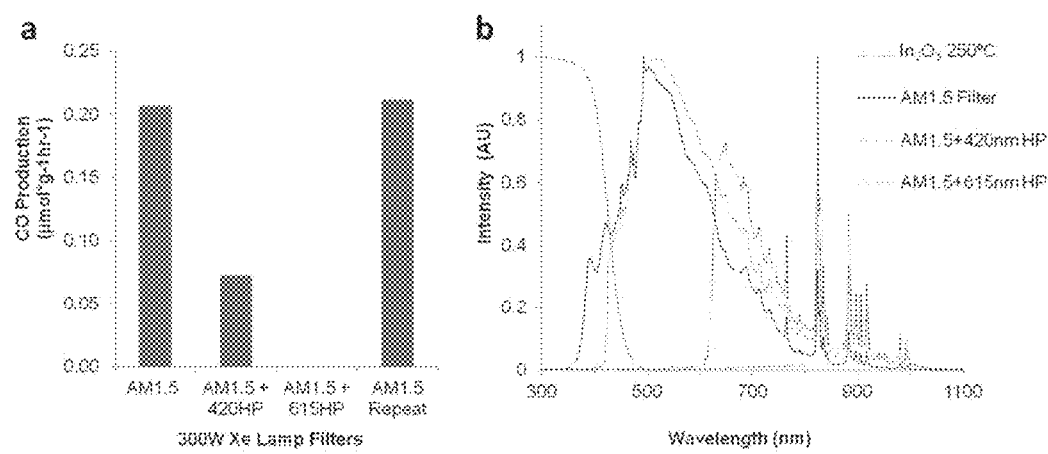
FIG. 5 demonstrates that the $In_2O_3$ nanostructured material is capable of producing CO under visible light only conditions. AM1.5 is a filter that simulates the solar spectrum. AM1.5+420 HP cuts out the ultraviolet portion of the solar spectrum and AM1.5+615 HP cuts out all of the light radiation from the solar spectrum with an energy greater than 615 nm wavelength.

The nanostructured hydroxylated metal oxide photocatalyst, exemplified by hydroxylated indium oxide nanoparticles $In_2O_{3-x}(OH)_y$ is capable of the photocatalytic reduction of $CO_2$ in the presence of $H_2$ at elevated temperatures (110° C.-170° C.) which produces CO via the reverse water gas shift reaction. In order to confirm the photocatalytic activity of the samples, carbon-13 isotope labeled carbon dioxide ($^{13}CO_2$) was used as a tracer molecule to identify products produced from $CO_2$ with and without irradiation. This is an important probe that determines whether the carbon source of the observed products originates from $CO_2$ or from adventitious carbon contamination of the sample (Yui, T. et al. ACS Appl. Mater. Interfaces 2011, 3, 2594-2600). FIG. 4a confirms that the primary source of carbon-13-labeled CO (corresponding to the 29 AMU mass fragment) produced photocatalytically arises from $^{13}CO_2$. After 16 hours of reaction at 150° C. under both light and dark conditions, it was found that CO is a product of $CO_2$ reduction produced only under light irradiation at an average rate of 0.2 µmol $g_{cat}^{-1}$ hour$^{-1}$ Under only visible light irradiation, ($\lambda$>420 nm) a photoreduction rate of 70 nmol $g_{cat}^{-1}$ hour$^{-1}$ at the same light intensity was observed. The photocatalytic reduction of $CO_2$ to CO is demonstrated in both ultraviolet with visible light and visible light only ($\lambda$>420 nm) in FIG. 5 which shows both the CO production rate in FIG. 5a and the spectral distribution of light irradiating the samples in FIG. 5b.

EXAMPLE

Methods:

Herein is a description of the synthesis of the nanostructured $In_2O_{3-x}(OH)_y$ which is also applicable to other nanostructure metal oxides. An $In(OH)_3$ precursor was synthesized and subsequently dehydrated into $In_2O_3$ nanoparticles. AH chemicals were used as received without any further purification. In a typical synthesis a suitable $In^{3+}$ salt was dissolved in a mixture of anhydrous alcohol and deionized water. In a separate beaker a basic solution was prepared by combining aqueous ammonium hydroxide with a suitable anhydrous alcohol. The basic solution was rapidly added to the In salt solution, resulting in the immediate formation of a white $In(OH)_3$ precipitate. To control the particle size, the resulting suspension was immediately immersed in a preheated oil bath at 80° C. and stirred for an appropriate amount of time to achieve the desired particle size. The suspension was then removed from the oil bath and allowed to cool to room temperature. The precipitate was separated via centrifugation and washed 3 times with deionized water, sonicating in between washings to ensure adequate removal of any trapped impurities. The precipitate was then dried overnight at 80° C. in a vacuum oven. The dried hydroxide precursor powder (average yield: 93.5%) was finely ground with a mortar and pestle and heated to a temperature between 250-450° C. for an appropriate amount of time to produce $In_2O_3$ (average yield: 97.2%). The $In_2O_3$ powder was then prepared for catalytic testing by drop casting an aqueous dispersion of each sample onto 1×1" binder free borosilicate glass microfiber filters (Whatman, GF/F, 0.7 μm). The only modification needed to generalize this synthesis to produce many other metal oxide nanoparticles is to replace the $In^{3+}$ salt indicated above with an appropriate trivalent metal ($M^{3+}$) salt that will form an insoluble metal hydroxide under basic conditions. The rest of the procedure can then be applied with little or no modification.

Thus the exemplified embodiment illustrates that indium oxide nanoparticles were prepared by thermal dehydroxylation of $In(OH)_3$ at various calcination temperatures to vary the surface hydroxide content and determine its effect on the photocatalytic reduction of $CO_2$. Surface hydroxides and oxygen vacancies are maximized at a calcination temperature of 250° C. and $In_2O_3$ nanoparticles prepared under these conditions produced CO from $CO_2$ at a rate of 0.2 μmol $g_{cat}^{-1}$ hour$^{-1}$ under 2.2 suns of simulated solar irradiation. It was also found that CO is produced under visible light ($\lambda$>420 nm) irradiation at a rate of 70 μmol $g_{cat}^{-1}$ hour$^{-1}$. $^{13}CO_2$-tracing experiments identified CO as the sole carbon product of $CO_2$ reduction in $H_2$ atmospheres at temperatures ranging from 110-170° C. under simulated solar irradiation. The abundance of surface hydroxides and oxygen vacancies correlated well to the $CO_2$ uptake and CO production rate, indicating that both hydroxides and surface vacancies play a key role in the reaction mechanism.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

The invention claimed is:

1. A nanostructured metal oxide composition comprising both hydroxide groups and oxygen vacancies on its surface, wherein the composition comprises hydroxylated indium oxide nanoparticles ($In_2O_{3-x}(OH)_y$), where x and y are integer or non-integer values and where x is greater than 0 and less than 3 and y is greater than 0 and less than 6.

2. The composition according to claim 1, wherein said nanostructured metal oxide composition has an average particle size of from about 1000 nm to about 1 nm.

3. The nanostructured metal oxide composition as claimed in claim 1, wherein the metal is selected from the group of metals consisting of a main group, a transition group and a rare earth group metal.

4. The composition according to claim 1, wherein said nanostructured metal oxide composition adsorbs carbon dioxide physically or chemically or both physically and chemically.

5. The composition according to claim 4, wherein said nanostructured metal oxide composition has an electronic configuration that provides long-lived photo-generated electron and hole-pairs, increasing the opportunity for charge transfer between the composition and adsorbed surface species.

6. The composition according to claim 5, wherein the charge transfer between the composition and the adsorbed surface species occurs through direct transfer of charge to the adsorbed surface species.

7. The composition according to claim 1, wherein said nanostructured metal oxide comprises a nanoparticle film or nanoparticles dispersed onto a support material.

8. The composition according to claim 7 wherein said nanoparticle film is formed using a method selected from the group consisting of sputtering, spin-coating, dip-coating, drop-casting, spray-coating, pulsed laser deposition and electro-spinning.

9. The composition according to claim 1, wherein the nanostructured metal oxide composition has a shape selected from the group consisting of solid spheres, cylinders, disks, platelets, hollow spheres and tubes.

10. The composition according to claim 1, wherein the metal oxide is a semiconductor having an electronic band-gap between 1 eV and 4.0 eV and a forbidden electronic band-gap.

11. The composition according to claim 1, wherein the metal oxide is photoactive towards the reduction of $CO_2$ in the gas phase or the liquid phase.

12. The composition according to claim 1, wherein the nanostructured metal oxide composition is prepared by a method selected from the group of methods comprising:
  i) controlled thermally induced dehydroxylation of nanostructured metal hydroxide precursors;
  ii) thermochemical reaction of said nanostructured metal oxide with hydrogen gas;
  iii) vacuum thermal treatment of said nanostructured metal oxide; and
  iv) aliovalent doping with a lower oxidation state metal.

13. The composition according to claim 12, wherein the composition is populated with surface hydroxide groups and oxygen vacancies by a controlled thermal dehydration of $In(OH)_3$, and calcined thereafter to improve its crystallinity for the purpose of increasing the mobility of photogenerated electronic charge carriers.

14. The composition according to claim 1, wherein y is greater than 0 and less than 3.

15. The composition according to claim 13, wherein y is greater than 0 and less than 3.

16. The composition according to claim 1, wherein said nanostructured metal oxide composition is a photocatalyst.

17. The composition according to claim 16, wherein said nanostructured metal oxide composition is a semiconductor photocatalyst.

18. A nanostructured metal oxide composition comprising both hydroxide groups and oxygen vacancies on its surface, wherein the crystal structure of the metal oxide contains bixbyite $M_2O_3$ lattice type as the oxygen vacancies.

19. The composition according to claim 5, wherein the charge transfer between the composition and the adsorbed surface species occurs through intermediate species formed by interaction of adsorbed surface species with the surface of the composition and/or other reactant gases.

20. The composition according to claim 1 for use in the photocatalytic reduction of carbon dioxide under visible or ultra violet light irradiation or both, either directly or via a surface intermediate species, to produce a fuel.

21. A process for preparing a nanostructured metal oxide composition comprising both hydroxide groups and oxygen vacancies on its surface, which hydroxide groups and oxygen vacancies can participate in chemical reactions, wherein the composition comprises hydroxylated indium oxide nanoparticles ($In_2O_{3-x}(OH)_y$), where x and y are integer or non-integer values and where x is greater than 0 and less than 3 and y is greater than 0 and less than 6, which composition is prepared by a method selected from the group of methods comprising:
   i) controlled thermally induced dehydroxylation of nanostructured metal hydroxide precursors;
   ii) thermochemical reaction of said nanostructured metal oxide with hydrogen gas;
   iii) vacuum thermal treatment of said nanostructured metal oxide; and
   iv) aliovalent doping with a lower oxidation state metal.

22. The process according to claim 21 for producing hydroxylated indium oxide nanoparticles ($In_2O_{3-x}(OH)_y$), where x and y are integer or non-integer values and where x ranges from 0 to 3 and y ranges from 0 to 3, populated with surface hydroxide groups and oxygen vacancies by a controlled thermal dehydration of $In(OH)_3$, and calcining the composition thereafter to improve its crystallinity for the purpose of increasing the mobility of photogenerated electronic charge carriers.

23. A photocatalyst comprising a nanostructured metal oxide composition comprising an optimal loading of both hydroxide groups and oxygen vacancies on its surface, which hydroxide groups and oxygen vacancies can participate in chemical reactions or physical reactions or both, wherein the composition comprises hydroxylated indium oxide nanoparticles ($In_2O_{3-x}(OH)_y$), where x and y are integer or non-integer values and where x is greater than 0 and less than 3 and y is greeter than 0 and less than 6.

24. The photocatalyst according to claim 23 for use in the photocatalytic reduction of carbon dioxide under visible or ultra violet light irradiation or both, either directly or via a surface intermediate species, to produce a fuel, wherein the fuel is selected from the group of fuels consisting of carbon monoxide, methane, methanol, or other hydrocarbons or to produce a feedstock.

25. The photocatalyst according to claim 23, further comprising co-catalysts, dopants and promoters, which are selected to enhance the overall conversion rate; to change product selectivity, to allow alternative reactions to proceed or to increase the range of the operating conditions.

26. The photocatalyst according to claim 23 for use in reactions which require activation of carbon dioxide in the presence of $H_2O$ or $H_2$ and are selected from methanol synthesis ($CO_2+2H_2O \rightarrow CH_3OH+3/2O_2$), methane synthesis ($CO_2+2H_2O \rightarrow CH_4+2O_2$), methanol synthesis ($CO_2+3H_2 \rightarrow CH_3OH+H_2O$), the Sabatier reaction ($CO_2+4H_2 \rightarrow CH_4+2H_2O$), reverse water gas shift reaction ($CO_2+H_2 \rightarrow CO+H_2O$), higher hydrocarbon synthesis ($nCO_2+(3n+1)H_2 \rightarrow C_nH_{2n+2}+2_nH_2O$), where $CO_2$ absorbs to the photocatalyst surface, enhanced by the optimised oxygen vacancy and hydroxyl surface, and is reduced by a photoelectron produced by exposure to visible and UV light irradiation.

27. A process for photocatalytically reducing $CO_2$ to produce CO using a photocatalyst according to claim 23.

28. The process for photocatalytically reducing $CO_2$ to produce CO using a photocatalyst according to claim 27 in the presence of solar radiation and $H_2$ atmosphere.

29. The composition according to claim 11, wherein the metal oxide is photoactive towards the reduction of $CO_2$ in the gas phase.

30. The photocatalyst according to claim 23 for use in the photocatalytic reduction of carbon dioxide under visible or ultra violet light irradiation or both, either directly or via a surface intermediate species, to produce a fuel.

* * * * *